United States Patent [19]

Jaggers et al.

[11] 3,806,595

[45] Apr. 23, 1974

[54] METHOD OF PRODUCING ANOREXIA

[75] Inventors: Stuart Edward Jaggers; Juan Luis Madinaveitta; Roy Frederick Maisey, all of Macclesfield, England

[73] Assignee: Imperial Chemical Industries Limited, London, England

[22] Filed: July 11, 1972

[21] Appl. No.: 270,687

[30] Foreign Application Priority Data
Aug. 9, 1971 Great Britain.................... 37299/71

[52] U.S. Cl. .............................................. 424/248
[51] Int. Cl............................................. A61k 27/00
[58] Field of Search...... 424/248; 260/247.7 C, 999; 421/DIG. 11

[56] References Cited
UNITED STATES PATENTS
3,714,161  1/1973  Mallion et al...................... 424/248

FOREIGN PATENTS OR APPLICATIONS
1,138,405  1/1969  Great Britain...................... 424/248

Primary Examiner—Albert T. Meyers
Assistant Examiner—Norman A. Drezin
Attorney, Agent, or Firm—Cushman, Darby & Cushman

[57] ABSTRACT

A method of producing anorexia in warm-blooded animals which comprises administering a substituted phenoxymethylmorpholine.

5 Claims, No Drawings

METHOD OF PRODUCING ANOREXIA

This invention relates to anorexiants and in particular it relates to a method of producing anorexia in man and animals.

In this specification the term "anorexia" is used to mean partial or complete loss of appetite, and this can have the beneficial effect of reducing weight, particularly in obese subjects.

It is well known that sympathomimetic amines such as amphetamine and phenmetrazine produce an anorexiant effect which, on continued administration of a given daily dose, becomes smaller with time. It is also known (U.K. Patent No. 1,138,405; U.S. Patent application Ser. No. 685,302) that phenoxymethylmorpholines have a depressant action on the central nervous system. The basis of the present invention is the discovery that these phenoxymethylmorpholines, which are chemically unrelated to the amphetamines, possess anorexiant activity and further that the effect produced on continued administration of a given dose of the compound is maintained for a longer period than would be the case with amphetamine.

According to the present invention there is provided a method of producing anorexia in warm blooded animals which comprises administering to the man or animal an anorectically effective amount of 2-(o-ethoxyphenoxymethyl)morpholine or 2-(m-methoxyphenoxymethyl)morpholine or a non-toxic, pharmaceutically-acceptable acid-addition salt thereof.

These compounds have the formula:

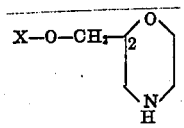

in which X is o-ethoxyphenyl or m-methoxyphenyl, and it will be observed that they posses an asymmetric carbon atom, marked 2 in the above formula, and the racemic form of each may therefore be resolved into two optically active forms by conventional means. These optically active forms may be defined in terms of their absolute configuration at the asymmetric carbon atom 2, using the (R) and (S) system of nomenclature (for an explanation of this system see R. S. Cahn, C. K. Ingold and V. Prelog, Angew, Chem. Intern. Ed., 1966, 5, 385). Both the (R) and (S) isomers of 2-(o-ethoxyphenoxymethyl)morpholine and 2-(m-methoxyphenoxymethyl)morpholine are effective in producing anorexia, but whereas the (S) isomers produce an anorexiant effect at a dose comparable to that of the racemate, the (R) isomer is less active than the (S) isomer. The invention thus includes the use of a racemate, an (S) isomer or an (R) isomer.

The method of producing anorexia is particularly effective when applied to man, but it is also useful when applied to dogs, particularly obese dogs.

The compounds of the invention may be administered to the man or animal orally or parenterally, for example by intraperitoneal or intramuscular injection. The preferred administration regimen for man is a total dose of 50–300 mg. per day (given in 1–3 doses per day) for 2–12 weeks and a particularly preferred regimen is a total daily oral dose of 120–180 mg. given in 3 doses per day for 2–12 weeks.

The preferred administration regimen for dogs is a total dose of 5–200 mg. per day (given in 1–3 doses per day) for 2–12 weeks and a particularly preferred regimen is a single daily oral dose of 10 mg./kg. for 2–12 weeks.

The invention is illustrated, but not limited, by the following Examples:

EXAMPLE 1

Ten female beagle dogs which had been maintained on a fattening diet for some months were individually housed and given a normal diet for 3 weeks in order to stabilise their weights and food intakes. Four dogs were used as controls, and the remaining six dogs were orally dosed with 10 mg./kg. of 2-(o-ethoxyphenoxymethyl)-morpholine once a day at 14.00 hours for a period of 6 weeks. Two meals a day were offered to all dogs at 09.00 and 16.00 hours. The six treated and four control dogs were grouped so as to have approximately the same mean group weight and distribution about the mean.

Individual changes in the body weights of the dogs after six weeks treatment are given in Table 1, and the average changes in body measurements are given in Table 2.

TABLE 1

| | | Initial Weight | Final Weight | Change lbs. as % | |
|---|---|---|---|---|---|
| Control Dogs | 1 | 45.4 | 50.7 | +5.3 +11.7 | Mean change |
| | 2 | 39.8 | 41.6 | +1.8 + 4.5 | +2.85 ± 1.80 lbs. |
| | 3 | 35.0 | 37.6 | +2.6 + 7.4 | |
| | 4 | 34.4 | 36.1 | +1.7 + 4.9 | |
| Treated Dogs | 1 | 44.8 | 37.9 | −6.9 −15.4 | |
| | 2 | 43.0 | 36.6 | −6.4 −15.0 | |
| | 3 | 38.0 | 38.5 | +0.5 + 1.0 | Mean change |
| | 4 | 32.1 | 31.6 | −0.5 − 1.6 | −2.60 ± 3.0 lbs. |
| | 5 | 34.4 | 32.5 | −1.9 − 4.5 | |
| | 6 | 34.0 | 33.4 | −2.0 − 2.0 | |

TABLE 2

| Measurement | Group | Before drug | After drug |
|---|---|---|---|
| Length (cms) | Controls | 36.2 | 36.2 |
| | Treated | 35.8 | 35.8 |
| Girth — chest (cms) | Controls | 24.4 | 24.3 |
| | Treated | 24.8 | 22.8 |
| Girth — belly (cms) | Controls | 23.6 | 24.0 |
| | Treated | 23.7 | 20.5 |

The food intake of the dogs for a period of nine weeks was also recorded, and the results are given in Table 3. Dosing commenced at the beginning of week 1 and stopped at the end of week 6. Before dosing commenced, the mean food intake per day of the control dogs was 1235 g. and of the treated dogs was 1114 g. During dosing, depression of food intake was seen in the treated dogs whereas the control dogs tended to show an increased food intake. Three weeks after dosing ceased, the treated dogs' food intake had increased to the point at which it was not significantly different from that of the control dogs.

These results are considered to be preliminary only because of the limited number of experiments. However it is clear that the (S) isomer has a similar potency to the racemate (Ex. 2) and the (R) isomer is active although less potent.

EXAMPLE 4

A male volunteer age 43, height 180 cm., weight 76 kg. was dosed orally with 80 mg. of 2-(o-ethoxyphenoxymethyl)morpholine at 08.00 hours. He did not normally eat breakfast and none was eaten that day. At 10.30 hours the subject was not hungry though he normally was hungry at that time and ate cookies. The subject was dosed with a further 80 mg. of compound at 12.00 hours. At 13.00 hours the subject was not hungry and drank only a cup of coffee. This was very unusual since on no occasion during the previous year had he not eaten a substantial lunch. At 16.00 hours the subject was dosed with a third 80 mg. of compound. At 18.30 hours he was presented with a meal which he could not eat, despite having taken no food throughout the day. The subject had felt perfectly well throughout the day and the only effect that he could detect was a loss of appetite. It was not known to him that anorexia was a possible effect of an oral dose of 2-(o-ethoxyphenoxymethyl)morpholine and he had previously taken part in studies which involved swallowing tablets of other substances without experiencing a loss of appetite.

TABLE 3

| | Week No. | 0 | 1 | 2 | 3 | 4 | 5 | 6 | 7 | 8 | 9 |
|---|---|---|---|---|---|---|---|---|---|---|---|
| Treated Dogs | Average food intake for the week gm./dog/day | 1114 | 1004 | 713 | 825 | 808 | 934 | 924 | 1159 | 1422 | 1487 |
| | % Change from initial weight eaten | 0 | −10 | −36 | −26 | −27 | −16 | −17 | +4 | +28 | +34 |
| Control Dogs | Average food intake for the week gm./dog/day | 1235 | 1446 | 1469 | 1496 | 1533 | 1546 | 1607 | 1529 | 1498 | 1435 |
| | % Change from initial weight eaten | 0 | +17 | +19 | +21 | +24 | +25 | +30 | +24 | +15 | +20 |

EXAMPLE 2

Mice weighing about 20 g. were starved for 48 hours, divided into groups of 10 (treated) and 20 (controls) and dosed orally with 0.2 ml. of vehicle with or without the drug. Food in the form of a length of uncooked spaghetti was offered immediately after dosing and the length of spaghetti eaten was measured after 1 hour. (The control mice ate continuously since they were hungry and the spaghetti was hard). The results are given in the Table in which the length of spaghetti eaten per mouse by the 10 treated mice is expressed as a percentage of that eaten by the 20 control mice.

TABLE

| | Dose in mg./kg. | 30 | 10 | 3 | 1 |
|---|---|---|---|---|---|
| 2-(o-ethoxy-phenoxymethyl)-morpholine | % of control | 39 | 63 | 86 | 89 |
| | number of experiments | 8 | 9 | 8 | 6 |
| | standard error | 8.5 | 5.0 | 7.7 | 6.2 |
| 2-(m-methoxy-phenoxymethyl)-morpholine | % of control | 9 | 40 | 71 | 79 |
| | number of experiments | 5 | 8 | 8 | 6 |
| | standard error | 8.8 | 7.6 | 6.7 | 5.9 |

EXAMPLE 3

The experiment described in Example 2 was repeated, except that the treated mice were dosed with the (R) and (S) isomers of 2-(o-ethoxyphenoxymethyl)morpholine. The results are given in the Table.

TABLE

| | Dose in mg./kg. | 100 | 30 | 10 | 3 |
|---|---|---|---|---|---|
| (R) isomer | % of Control | 27 | 89 | 107 | 130 |
| | number of experiments | 2 | 4 | 2 | 1 |
| (S) isomer | % of Control | 17 | 54 | 88 | 103 |
| | number of experiments | 2 | 4 | 2 | 1 |

EXAMPLE 5

A male volunteer, age 33, height 173 cm., weight 66.5 kg., was dosed orally with 100 mg. of 2-(o-ethoxyphenoxymethyl)morpholine 2 hours before a midday meal. A pronounced anorectic effect was experienced 2 hours after dosing.

EXAMPLE 6

A male volunteer, age 28, height 173 cm., weight 73 kg. was dosed orally with 100 mg. of 2-(o-ethoxyphenoxymethyl)morpholine 1.5 hours before a meal. A prounounced anorectic effect was experienced which lasted for 2.5 – 3 hours. The experiment was repeated twice with similar results.

EXAMPLE 7

A male volunteer, age 21, height 170 cm., weight 62 kg. was dosed orally with 80 mg. of 2-(o-ethoxyphenoxymethyl)morpholine at 09.00 hours. A pronounced anorectic effect was experienced at a mealtime 3–3½ hours later.

What we claim is:

1. A method of producing anorexia in a warm blooded animal in need of such effect which comprises administering to said animal an anorectically effective amount of a compound selected from the group consisting of a compound of the formula:

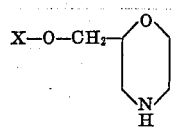

wherein X is selected from the group consisting of o-ethoxyphenyl and m-methoxyphenyl, and the non-toxic, pharmaceutically-acceptable acid-addition salt thereof.

2. A method as claimed in claim 1 in which the warm-blooded animal is a man.

3. A method as claimed in claim 1 in which the warm-blooded animal is a dog.

4. A method as claimed in claim 2 in which a man is dosed with between 50 and 300 mg. per day of the compound for a period of from 2 to 12 weeks.

5. A method as claimed in claim 3 in which a dog is dosed with between 5 and 200 mg. per day of the compound for a period of from 2 to 12 weeks.

* * * * *